United States Patent

Anthony et al.

Patent Number: 6,085,868
Date of Patent: Jul. 11, 2000

[54] PORTABLE TREE STAND ASSEMBLY HAVING SEAT AND PLATFORM WITH POSITION ADJUSTMENT ARRANGEMENT

[76] Inventors: Tod E. Anthony, P.O. Box 225, Dighton, Kans. 67839; Michael Schirer, 5804 Mickey Dr., Farmington, N. Mex. 87402

[21] Appl. No.: 09/134,052

[22] Filed: Aug. 14, 1998

[51] Int. Cl.[7] .................................................. E04G 3/00
[52] U.S. Cl. .......................................... 182/187; 108/152
[58] Field of Search .................................... 182/187, 133, 182/136, 188, 2.7, 115, 116, 123; 108/152

[56] References Cited

U.S. PATENT DOCUMENTS

| | | | |
|---|---|---|---|
| 1,020,061 | 3/1912 | Sheetz et al. | 182/2.7 |
| 3,817,350 | 6/1974 | Gray | 182/187 |
| 4,549,635 | 10/1985 | Early | 182/187 |
| 4,552,246 | 11/1985 | Thomas | 182/116 |
| 4,579,198 | 4/1986 | Lee | 108/152 X |
| 4,782,918 | 11/1988 | Brunner et al. | 182/187 |
| 4,802,552 | 2/1989 | Williams | 182/187 |
| 4,987,972 | 1/1991 | Helms | 182/187 |
| 5,143,177 | 9/1992 | Smith | 182/187 |
| 5,363,941 | 11/1994 | Richard | 182/187 |
| 5,458,215 | 10/1995 | Burgin | 182/187 |
| 5,462,135 | 10/1995 | Ambler et al. | 182/187 |
| 5,469,934 | 11/1995 | Pherigo | 182/187 |
| 5,562,180 | 10/1996 | Herzog et al. | 182/187 |
| 5,791,436 | 8/1998 | Talley, Sr. | 182/187 X |

*Primary Examiner*—Daniel P. Stodola
*Assistant Examiner*—Richard M. Smith
*Attorney, Agent, or Firm*—Flanagan & Flanagan; John R. Flanagan; John K. Flanagan

[57] ABSTRACT

A portable tree stand assembly includes a support bracket structure, a seat, a platform and a seat and platform position adjustment arrangement. The support bracket structure is attachable to a supporting tree. The support bracket structure has an upper end portion and a lower end portion. The seat is pivotally mounted to the upper end portion of the support bracket structure. The platform is pivotally mounted to the lower end portion of the support bracket structure. The seat and platform position adjustment arrangement interconnects the seat and platform to a middle portion of the support bracket structure extending between and interconnecting the upper and lower end portions thereof. The seat and platform position adjustment arrangement is adjustable to moveably place and retain the seat and platform in a substantially parallel relation to one another and in respective level positions for a range of lean angles of the supporting tree to which the support bracket structure is attached.

5 Claims, 5 Drawing Sheets

PORTABLE TREE STAND ASSEMBLY HAVING SEAT AND PLATFORM WITH POSITION ADJUSTMENT ARRANGEMENT

BACKGROUND OF THE INVENTION

1. Field of the Invention

The present invention generally relates to tree-mountable stands and, more particularly, is concerned with a portable tree stand assembly having a seat and platform and different arrangements for adjusting the positions of the seat and platform relative to the lean of a tree which supports the tree stand.

2. Description of the Prior Art

Portable tree stands are widely used for supporting hunters, nature enthusiasts, photographers and others at an elevated position in a tree to watch for game and to observe wildlife. Representative examples of portable tree stands are disclosed in U.S. Pat. No. 3,817,350 to Gray, U.S. Pat. No. 4,782,918 to Brunner et al., U.S. Pat. No. 5,363,941 to Richard, U.S. Pat. No. 5,458,215 to Burgin and U.S. Pat. No. 5,462,135 to Ambler et al.

Portable tree stands, such as those disclosed in the Brunner et al., Richard and Ambler et al. patents, are well-known having seats and foot rests or platforms which are pivotally supported by a support bracket structure which is attachable to a tree. The seats and platforms of some prior art portable tree stands, however, are not adjustable to different angular inclinations or positions relative to the support bracket structure of the stand in order to compensate for variations in the vertical angle of the supporting tree and thereby permit leveling of the seat and platform. Other prior art tree stands permit leveling of the platform but not the seat. Thus, the seats and platforms of prior art portable tree stands are not adjustable to positions where they are substantially parallel to one another or substantially level along a horizontal reference irrespective of the inclination of the lean of the supporting tree.

Consequently, a need remains for a portable tree stand that will retain the seat and platform generally parallel to one another irrespective of the lean of a supporting tree.

SUMMARY OF THE INVENTION

The present invention provides a portable tree stand assembly designed to satisfy the aforementioned need. The portable tree stand assembly of present invention has an upper seat and a lower platform pivotally mounted to a support bracket structure and which can employ any one of three different embodiments of an arrangement for adjusting the positions of the seat and the platform relative to the support bracket structure and thus to the lean of the tree supporting the tree stand. These three different embodiments of the seat and platform position adjustment arrangement provide a variety of choices for users in accomplishing the seat and platform position adjustment and thereby meet different preferences a user may have depending upon the conditions the user faces in actual field use.

Accordingly, the present invention is directed to a portable tree stand assembly which comprises: (a) a support bracket structure attachable to a supporting tree and having an upper end portion and a lower end portion; (b) a seat pivotally mounted to the upper end portion of the support bracket structure; (c) a platform pivotally mounted to the lower end portion of the support bracket structure; and (d) a seat and platform position adjustment arrangement interconnecting the seat and platform to the support bracket structure between the upper and lower portions thereof and being adjustable relative to the support bracket structure to movably place and retain the seat and platform in a substantially parallel relation to one another and respective substantially level positions for a range of lean angles of the support bracket structure. In all embodiments of the assembly, the support bracket structure also has a middle portion disposed between and interconnecting the upper and lower end portions.

A first embodiment of the seat and platform position adjustment arrangement includes an elongated arm, pivot means for pivotally interconnecting the arm between the seat and platform, and a pair of cables. The elongated arm has opposite ends. The pivot means includes a T-bar pivotally mounted to the seat and connected to one opposite end of the arm. The pivot means also includes support brackets attached to the platform and pivotally connected to arm at the other opposite end thereof. Each cable has opposite ends and is connected at one end to the platform and at the other end to selected ones of pluralities of attachment element provided on the middle portion of the support bracket structure at different vertically spaced locations therealong. The attachment elements can be a plurality of hook members mounted at the different vertically spaced locations on the middle portion of the support bracket structure.

A second embodiment of the seat and platform position adjustment arrangement includes a pair of plates, a seat brace member and a pair of cables. The pair of plates are mounted to the middle portion of the support bracket structure. Each plate defines a plurality of notches at different vertically spaced locations thereon. The seat brace member has a substantially U-shaped configuration and opposite ends. The seat brace member is pivotally mounted at one end to the seat and is releasably receivable at the other end within selected ones of the notches on the plates. Each cable has opposite ends and is connected at one opposite end to the seat brace member at the selected one of the different vertically spaced locations and is connected at the other opposite end to the platform.

A third embodiment of the seat and platform position adjustment arrangement includes variations of the second embodiment. One variation includes the seat brace member having a substantially U-shaped configuration formed by a pair of side links having opposite ends and a middle link disposed between and interconnecting one opposite end of one side link and one opposite end of the other side link. The seat brace member is pivotally mounted at the other of the opposite ends of the side links to the seat and is securable within the notches on the plates at the different vertically spaced locations. Each side link also defines a series of spaced apart recesses. The opposite ends of each cable are attachable to one of the side links of the seat brace member at the selected ones of the spaced apart recesses and attached at the other opposite end to the platform.

Another variation includes a pair of substantially inverted U-shaped mounting brackets mounted to the platform. Each substantially inverted U-shaped mounting bracket defines a series of spaced apart notches. The opposite ends of each cable are pivotally mountable to the substantially inverted U-shaped mounting brackets of the platform at the spaced apart cutouts. The opposite ends of each cable are attached to the seat brace member as in the second embodiments.

A third variation has a plurality of hook members mounted at the different vertically spaced locations on the middle portion of the support bracket structure similar to the first embodiment. One end of each cable are coupled to a selected one of the hook members. The opposite end of each cable is pivotally mounted to one of a pair of loop members on the platform as in the first variation of the third embodiment.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
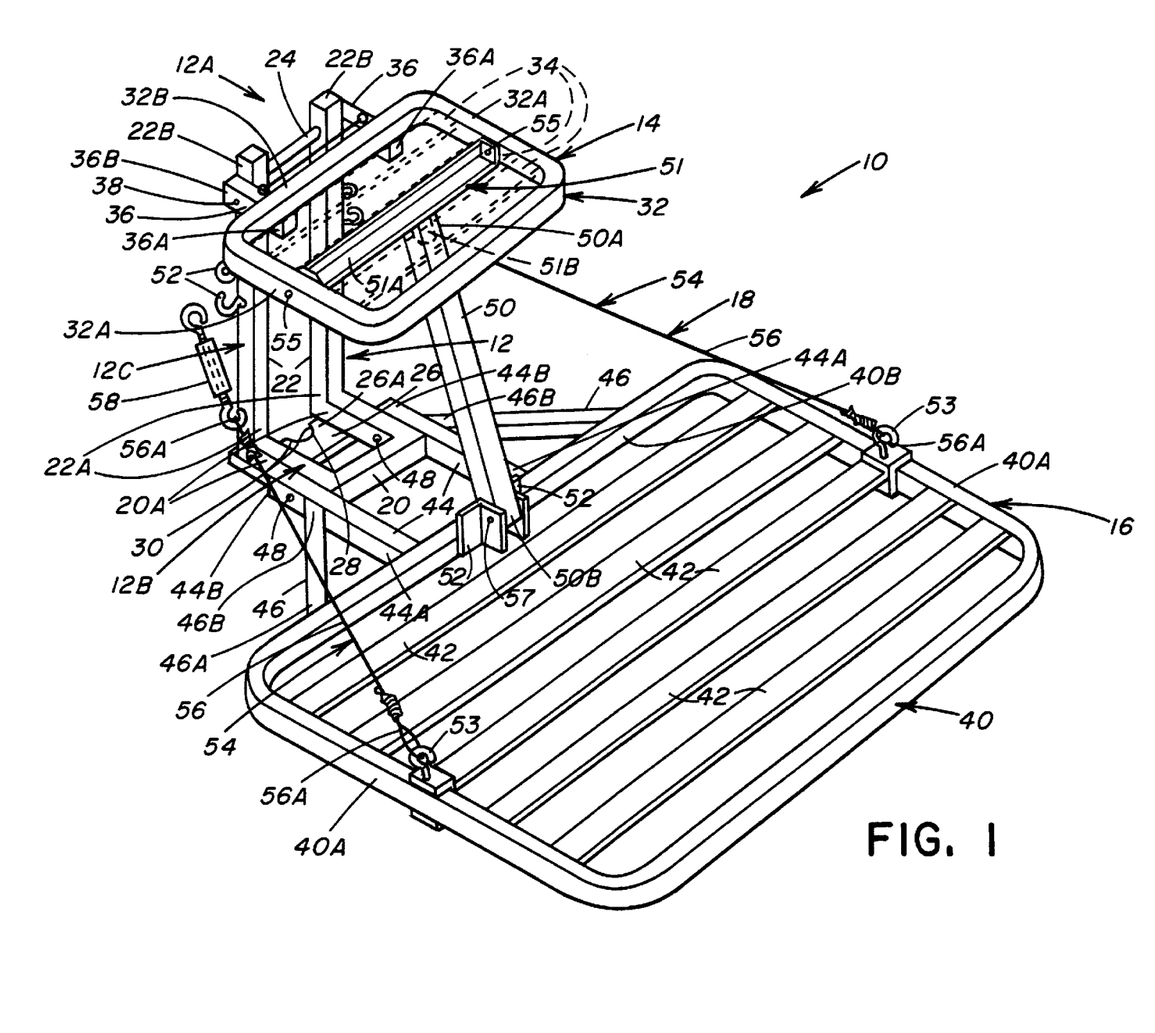
FIG. 1 is a perspective view of a portable tree stand assembly of the present invention shown in an erect condition and having a first embodiment of a seat and platform position adjustment arrangement employing a single elongated arm pivotally interconnecting the seat and platform.
Figures 2A, 2B:
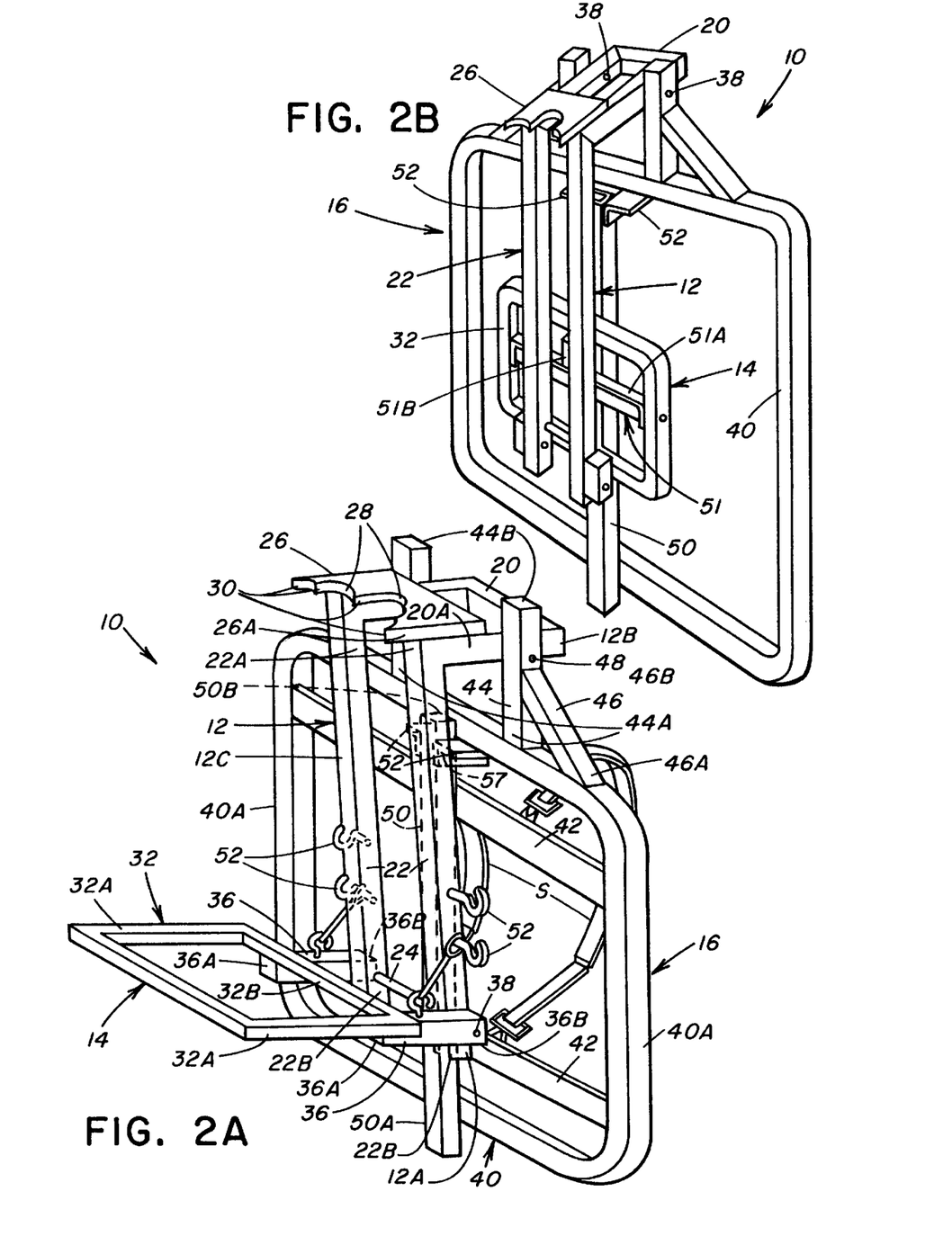
FIG. 2A is a perspective view of the portable tree stand assembly of FIG. 1 shown in a semi-collapsed condition.
FIG. 2B is a perspective view of the portable tree stand assembly of FIG. 1 shown in a fully collapsed condition.

Referring to the drawings and particularly to FIGS. 1 and 2, there is illustrated a portable tree stand assembly, generally designated 10, having features in accordance with the principles of the present invention. Basically, the portable tree stand assembly 10 includes a support bracket structure 12 attachable by any suitable means well-known to one of ordinary skill in the art to a supporting tree (not shown) and having upper and lower end portions 12A, 12B and a middle portion 12C extending between and interconnecting the upper and lower end portions 12A, 12B, a seat 14 pivotally mounted to the upper end portion 12A, a platform 16 pivotally mounted to the lower end portion 12B, and a seat and platform position adjustment arrangement 18 interconnecting the seat 14 and platform 16 to the middle portion 12C of the support bracket structure 12. The position adjustment arrangement 18 is adjustable relative to the support bracket structure 12 to movably place and retain the seat 14 and platform 16 in a substantially parallel relation to one another and in respective substantially level positions for a range of lean angles of the support bracket structure 12, such as for example twenty degrees away from vertical of the supporting tree to which the support bracket structure 12 is attached.

The support bracket structure 12 of the assembly 10 has a substantially L-shaped configuration and includes an U-shaped horizontal member 20, a pair of vertical members 22, an upper transverse member 24, and at least one supporting tree abutting member 26. The horizontal member 20 is rigidly attached at its rear ends 20A to respective lower ends 22A of the vertical members 22 such that the vertical members 20 extends upright from and in substantially perpendicular relation to the horizontal member 20 and in parallel relation to one another. The upper transverse member 24 extends between and is attached at opposite ends to the vertical members 22 adjacent to their upper ends 22B. The upper transverse member 24 has a substantially cylindrical configuration, though may have any other suitable shape. Each of the horizontal member 20 and vertical members 22 in transverse cross-section has a substantially rectangular configuration, though may have any other suitable shape. The tree abutting member 26 is mounted to at least an underside of the horizontal member 20 adjacent to its rear ends 20A and extends beyond the rear ends 20A toward the supporting tree so as to contact the tree. As shown in FIGS. 4 and 6–10, another tree abutting member 26 can also be provided on the upper ends 22B of the vertical members 22 in the embodiment of FIGS. 1, 2A and 2B. Although not shown in FIG. 3, the tree abutting members 26 would be provided in that embodiment as well. For engaging the tree in a non-slip fashion so that the assembly 10 will not slide down the tree, the tree abutting member 26 particularly has inwardly curved notches 28 defined therein along the rear portion 26A of the tree abutting member 26 forming rearwardly pointed teeth 30 for making direct gripping contact with the supporting tree. The tree abutting member 26 has a substantially flat plate configuration, though may have any other suitable shape. As mentioned earlier, suitable attaching means, such as a flexible cord or chain C (as seen in FIGS. 4 and 6), well-known to one of ordinary skill in the art, can be wrapped tightly around the middle portion of the support bracket structure 12 and around the supporting tree so as to function in conjunction with the gripping teeth 30 of the tree abutting member 26 and the weight of the assembly 10 to retain the assembly 10 in place on the supporting tree at any desired height. Alternatively, a U-shaped bracket (not shown) supported by a strap (not shown) tightened around the tree can be used in conjunction with the gripping teeth 30 of the tree abutting member 26 to mount or hang the tree stand assembly 10 at any desired height on the supporting tree. Specifically, to mount the assembly 10 thereon the U-shaped bracket would receive the upper transverse member 24 of the support bracket structure 12.

By way of example, the seat 14 of the assembly 10 includes a continuous perimeter member 32 and a plurality of interior slat members 34 extending transversely between and attached at opposite ends to opposite sides 32A of the seat perimeter member 32. The seat perimeter member 32 has a substantially oblong or rectangular configuration, though may have any other suitable shape, and a substantially rectangular configuration in transverse cross-section, though may have any other suitable transverse cross-sectional shape. The interior slat members 34 substantially lie in the plane of the seat perimeter member 32. Each interior slat member 34 is substantially elongated and has a substantially flat rectangular configuration in transverse cross-section, though may have any other suitable shape.

The seat 14 also includes a pair of horizontal seat connection members 36 fixedly attached at forward ends 36A to an underside of a rear end 32B of the seat perimeter member 32 and extending rearwardly beyond the rear end 32B to along the outer sides of the upper ends 22B of the vertical members 22 of the support bracket structure 12. Each seat connection member 36 at a rearward end 36B is pivotally mounted by a pivot pin 38 to the upper end 22B of one of the vertical members 22 of the support bracket structure 12 at about the same elevation as the upper transverse member 24. The seat connection members 36 have a substantially rectangular configuration in transverse cross-section, though may have any other suitable shape.

By way of example also, the platform 16 of the assembly 10 includes a continuous perimeter member 40 and a plurality of interior board members 42 extending transversely between and attached at opposite ends to opposite sides 40A of the platform perimeter member 40. The platform perimeter member 40 has a substantially oblong or rectangular configuration, though may have any other suitable shape, and a substantially rectangular configuration in transverse cross-section, though may have any other suitable transverse cross-sectional shape. The interior board members 42 substantially lie in the plane of the platform perimeter member 40. Each interior board member 42 is substantially elongated and has a substantially flat rectangular configuration in transverse cross-section, though may have any other suitable shape.

The platform 16 also includes a pair of horizontal platform connection members 44 and a pair of horizontal platform brace members 46, all of which are fixedly attached at forward ends 44A, 46A to a rear end 40B of the platform perimeter member 40 and extend rearwardly therefrom. The platform connection members 44 extend from the platform perimeter member 40 to along the outer sides of the side legs 20B of the horizontal member 20 of the support bracket structure 20. Each platform connection member 44 at a rearward end 44B is pivotally mounted by a pivot pin 48 to one of the side legs 20B of the horizontal member 20. The platform brace members 46 are fixedly connected to the rear end 40A of the platform perimeter member 40 at locations spaced laterally from the locations of connection of the platform connection members 44 to the platform perimeter member 40. The platform brace members 46 therefrom to the outer sides of the respective platform connection members 44 near the rearward ends 44B thereof where the rearward ends 46B of the platform brace members 46 are fixedly connected to the platform connections members 44 so as to provide reinforcement of the same. Thus, each platform connection member 44 extends substantially parallel to the side legs 20B of the horizontal member 20 whereas each platform brace member 46 extends diagonally at about a forty-five degree angle to the rear end 40B of the platform perimeter member 40 and to the respective platform connection member 44. Each of the platform connection members 44 and platform brace members 46 has a substantially rectangular configuration in transverse cross-section, though may have any other suitable shape. Overall, the platform 16 has substantially the same construction as the seat 14, but is greater in size.

Referring again to FIGS. 1 and 2, there is depicted a first embodiment of the position adjustment arrangement 18 of the assembly 10 for adjusting the respective positions of the seat 14 and platform 16. The first position adjustment arrangement 18 includes an elongated arm 50, means for pivotally connecting the opposite ends 50A, 50B of the arm 50 to the seat 14 and platform 16 in the form of an upper pivotal T-bar 51 and a lower pair of mounting brackets 52, and means for interconnecting the platform 16 to the support bracket structure 12 in the form of a plurality of attachment elements 53 and a pair of elongated coupling members 54. The pivotal T-bar 51 has a cross member 51A which underlies the middle slat member 34 of the seat 14 and is pivotally mounted at its opposite ends by pivot pins 55 to the opposite sides 32A of the perimeter member 32 of seat 14. The pivotal T-bar 51 also has a stem member 51B attached to and extending generally perpendicularly to and downwardly from the cross member 51A thereof and slidably received within the upper end 50A of the elongated arm 50. The pivotal T-bar 51 provides pivotal connection of the elongated arm 50 with the seat 14 during use of the tree stand assembly 10 in an erect condition shown in FIG. 1, yet allows easy disconnection of the arm 50 from the seat 14 when it is desired to convert the tree stand assembly 10 from the erect condition of FIG. 1 to either a semi-collapsed condition of FIG. 2A or to a fully collapsed condition of FIG. 2B. The lower pair of mounting brackets 52 are fixedly attached to the rear end 40B of the perimeter member 40 of the platform 16. The lower end 50B of the elongated arm 50 is pivotally connected by pivot pin 57 between the mounting brackets 52. The elongated arm 50 has a substantially rectangular configuration in transverse cross-section, though may have any other suitable shape.

The attachment elements 53 are respective hook members provided on both the opposite sides 40A of the perimeter member 40 of the platform 16 and on the vertical members 22 of the support bracket structure 12. Each elongated coupling member 54 includes an elongated flexible cable 56 having loops 56A formed at its opposite ends and a turnbuckle element 58. The loops 56A at one of the opposite ends of the cables 56 are attached to the hook members 52 on the platform 16 whereas the loops 56A at the other of the opposite ends of the cables 56 are attached to the turnbuckle elements 58 which, in turn, are coupled to the hook members 52 on the vertical members 22 of the support bracket structure 12. The latter hook members 52 are disposed at different vertically spaced locations thereon and in pairs at the same elevations therealong. The turnbuckle elements 58 are operable in a known manner to adjust (increase or decrease) the length of the respective cable 56.

As mentioned above, the portable tree stand assembly 10 is movable or convertable between the erect condition, as shown in FIG. 1, and two collapsed conditions, the semi-collapsed condition as shown in FIG. 2A and the fully collapsed condition as shown in FIG. 2B. The collapsed conditions of the assembly 10 are provided to enable the use of back straps S for the carrying of the assembly 10 on a user's back. The fully collapsed condition of the assembly 10 is provided to enable maximum compactness of the assembly 10 for storage thereof when not being used. The parallel movements of the seat 14 with platform 16 when the assembly 10 is at the erect condition of FIG. 1 is achieved by the relationship of the pivotal interconnections of the seat 14 and platform 16 to one another through the elongated arm 50 and the pivotal T-bar 51 and the pivotal interconnections of the seat 14 and platform 16 to the upper and lower end portions 12A, 12B of the support bracket structure 12. Such pivotal interconnections provide distances from the pivot pins 38 to the pivot pins 55 that are equal to distances from the pivot pins 48 to the pivot pin 57 and provide distances from the pivot pins 38 to the pivot pins 48 that are equal to distances from the pivot pins 55 to the pivot pin 57 which thereby establishes a parallelogram relationship between the support bracket structure 12, arm 50, seat 14 and platform 16 that ensures the seat 14 will pivot with and remain in the same orientation as the platform 16 as the platform 16 is pivoted relative to the support bracket structure 12.

Figure 3:
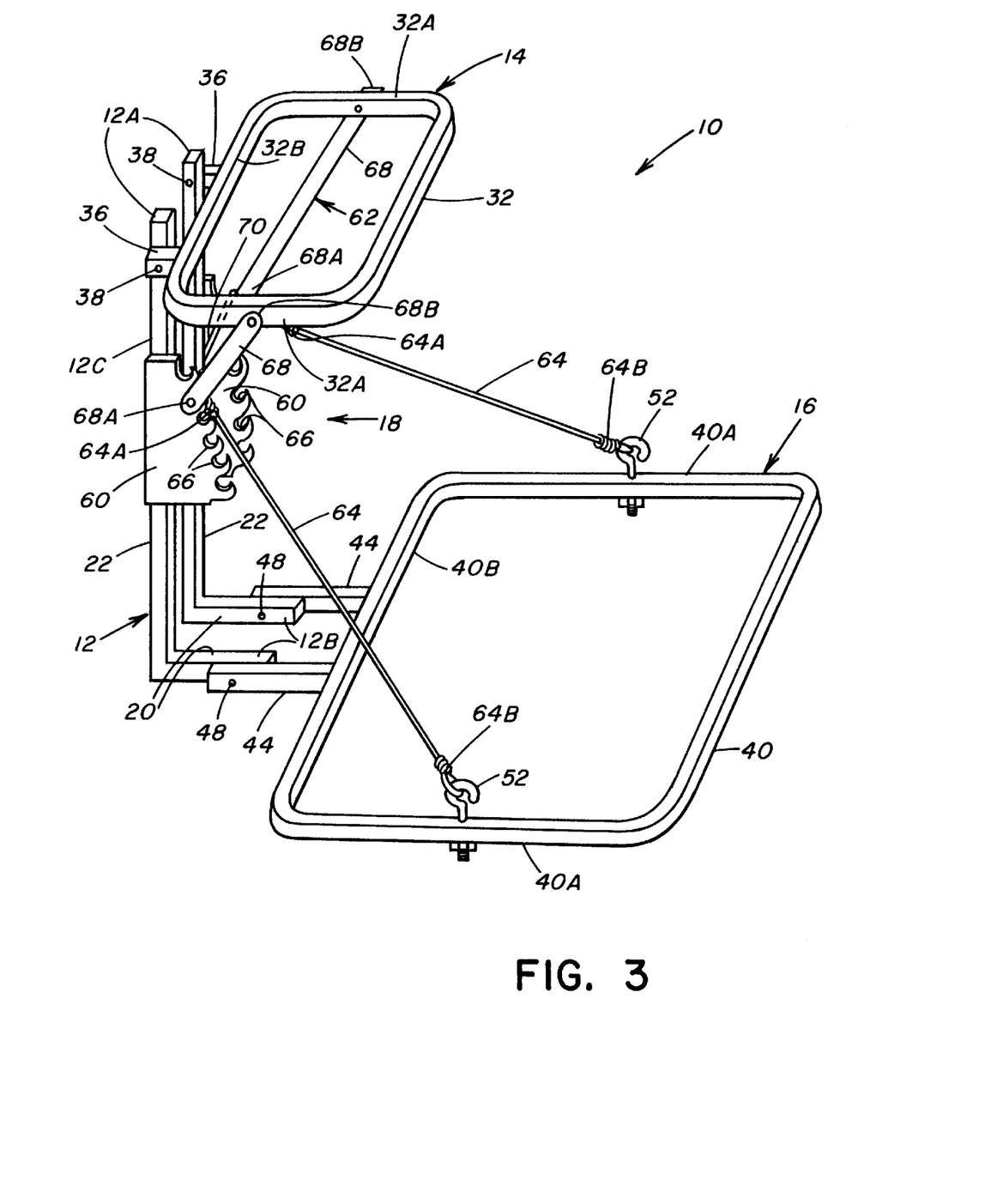
FIG. 3 is a perspective view of the portable tree stand assembly of the present invention shown in an erect condition and having a second embodiment of the seat and platform position adjustment arrangement employing a pair of plates each having a plurality of notches defined along a convexly curved path.
Figures 4, 5, 6:
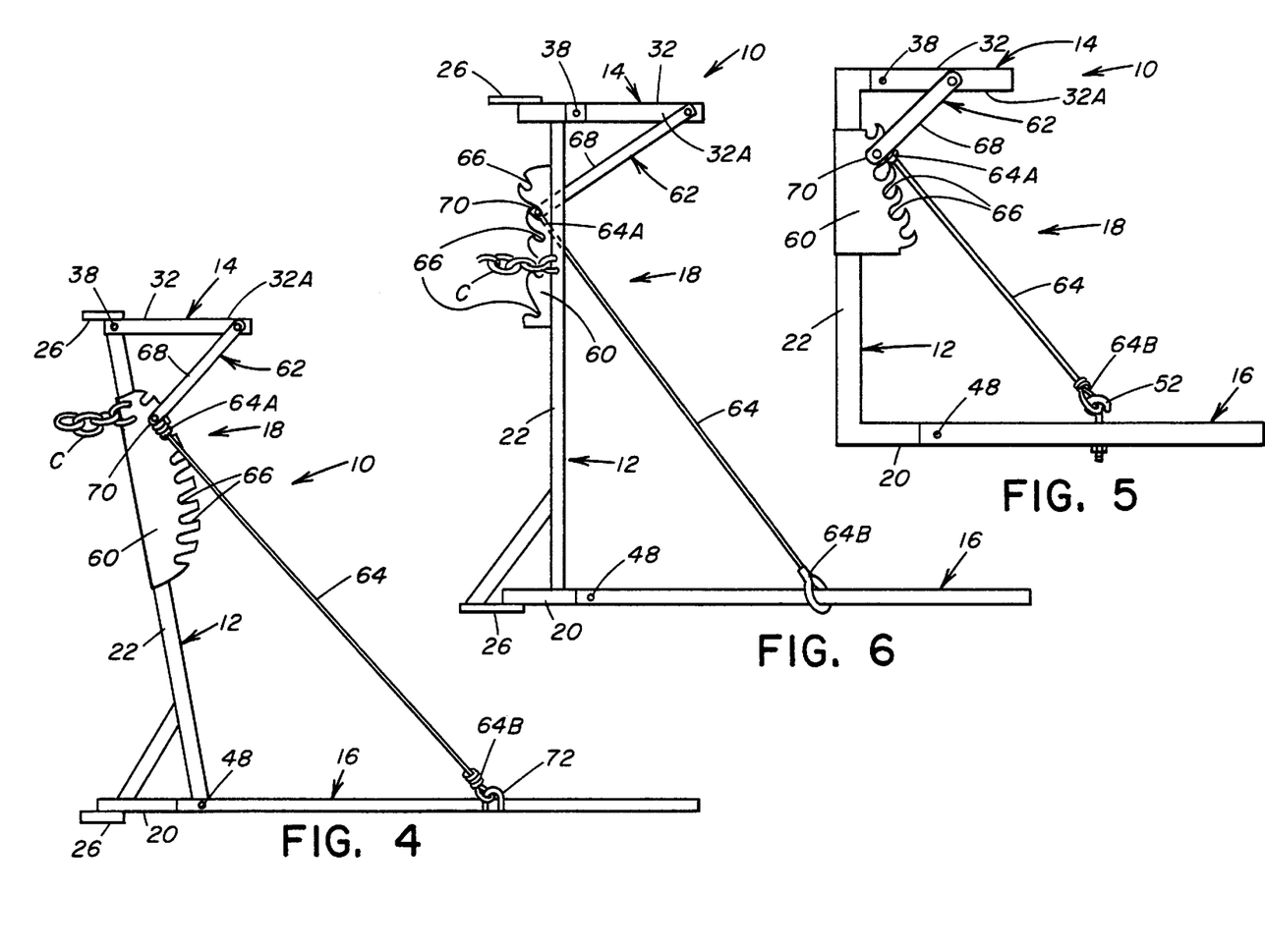
FIG. 4 is a side elevational view of the portable tree stand assembly slightly modified from that of FIG. 3.
FIG. 5 is a side elevational view of the portable tree stand assembly similar to that of FIG. 3 except that the notches in the plate are defined along an angled straight line path.
FIG. 6 is a side elevational view of the portable tree stand assembly slightly modified from that of FIGS. 3 to 5 in that the plate with the series of notches is facing in an opposite direction and are defined along a concavely curved path.

Referring now to FIGS. 3 to 6, there is depicted a second embodiment of the position adjustment arrangement 18 for adjusting the positions of the seat 14 and platform 16. The second position adjustment arrangement 18 includes a pair of plates 60, a seat brace member 62 and the pair of cables 64. The pair of plates 60 are attached to the middle portion 12C of the support bracket structure 12. Each plate 60 is particularly mounted to one of the vertical members 22 and at the same vertical level or elevation as the other plate 60 on the other vertical member 22. Each plate 60 has a substantially flat configuration, though may have any other suitable shape. Each plate 60 defines a series of notches 66 at different vertically spaced locations. The notches 66 may be defined along a convexly curved path as shown in FIGS. 3 and 4, along a angled straight line path as shown in FIG. 5, or along a concavely curved path as shown in FIG. 6. The plates 60 are disposed such that the notches 66 either face in a direction away from the supporting tree, as shown in FIGS. 3–5, or face in a direction toward the supporting tree, as shown in FIG. 6.

The seat brace member 62 has a substantially U-shaped configuration and includes a pair of side links 68 and a middle cross link 70 disposed between and interconnecting one of the opposite ends 68A of the side links 68 to one another. The seat brace member 62 is pivotally mounted at the other of the opposite ends 68B of the side links 68 to the seat 14, particularly to opposite sides 32A of the seat perimeter member 32. The middle cross link 70 is releasably receivable within a selected one aligned pairs of the notches 66 on the plates 60 to place and retain the seat in a substantially level position at a selected one of the different vertically spaced locations of the notches 66.

Each of the cables 64 are like the cables 56 of the first embodiment. However, the cables 64 are now connected at the one ends 64A to the middle cross link 70 of the seat brace member 62 and coupled at the other ends 64B to the platform 16. The opposite end 64B of each cable 64 may, particularly, be pivotally mounted directly to the platform perimeter member 40, as shown in FIG. 6, or to one of the hook members 52 on the platform 16, as shown in FIGS. 3 and 5. The platform 16 may alternativly have a pair of loop members 72 to which the other ends 64B of the cable 64 may be attached, as shown in FIG. 4.

Referring now to FIGS. 7 to 10, there are depicted several variations of a third embodiment of the position adjustment arrangement 18 for adjusting positions of the seat 14 and platform 16. The variations are similar to the second embodiment, shown in FIGS. 3 to 6, but have separate members allowing for independent adjustment of the positions of the seat 14 and platform 16 relative to one another and to the support bracket structure 12. One variation of the third position adjustment arrangement 18 shown in FIG. 7 has a turnbuckle element 58 connected between the one end 64A of each cable 64 and the middle cross link 70 of the seat brace member 62. Another variation of the third position adjustment arrangement 18 shown in FIG. 8 has a series of spaced apart recesses (or alternatively pins) 74 defined on each of the side links 68 of the seat brace member 62. The one ends 64A of the cables 64 are coupled to the seat brace member 62 at selected ones of the spaced apart recesses 74 whereas the other ends 64B are coupled to the loop members 72 on the platform 16.

Figures 7, 8, 9, 10:
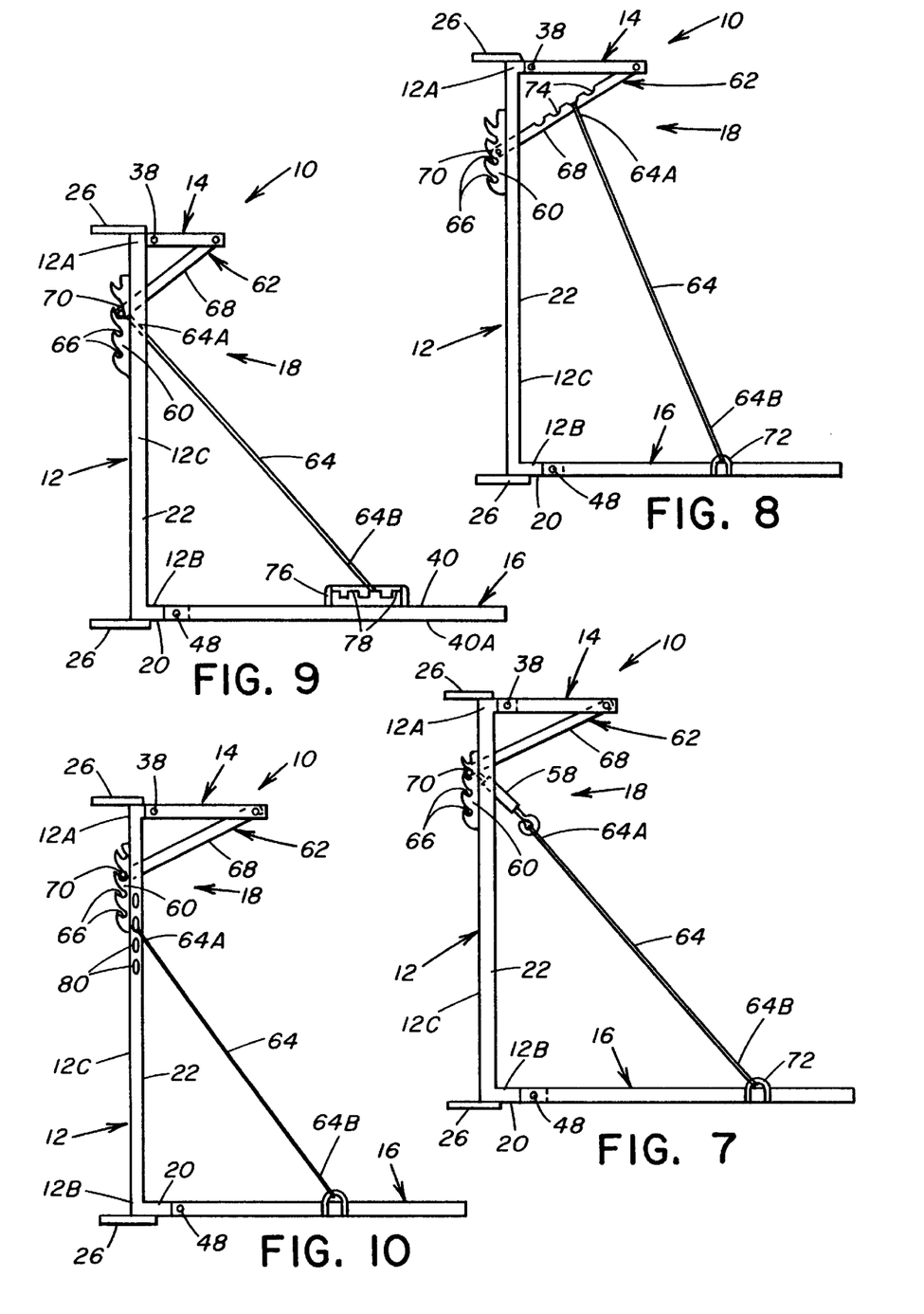
FIGS. 7 to 10 are side elevational views of the portable tree stand assembly of the present invention shown in an erect condition and having a third embodiment of the seat and platform position adjustment arrangement employing a notched plate similar to the second embodiment of FIG. 6 but having separate members that allow for independent adjustment of the positions of the seat and platform relative to one another.

Still another variation of the third position adjustment arrangement 18 shown in FIG. 9 includes a pair of substantially inverted U-shaped mounting brackets 76 mounted to the platform 16, particularly to opposite sides 40A of the platform perimeter member 40. Each inverted U-shaped mounting bracket 76 defines a series of spaced apart cutouts 78. The opposite ends 64B of each cable 64 are coupled to the inverted U-shaped mounting brackets 76 of the platform 16 at selected ones of the spaced apart cutouts 78. The opposite ends 64A of each cable 64 are connected to the cross link 70 of the seat brace member 62 as in the second embodiments.

A final variation of the third position adjustment arrangement 18 is shown in FIG. 10. In this variation, the support bracket structure 12 has a plurality of attachment elements in the form of hook members 80 mounted at the different vertically spaced locations on the middle portion 12C thereof, particularly to one of the vertical members 22, similar to the first embodiment. The opposite ends 64A of each cable 64 are connected to a selected one of the hook members 80 and to one of the loop members 72 on the platform 16 as in the first variation of the third embodiment.

It will be noted that in the third embodiments of FIGS. 7–10, the notches 66 in the plate 60 are located on a straight line path. Also, the position of the tooth plate 60 can be reversed such that the notches 66 face away from the tree instead of toward it. The third embodiments are otherwise substantially similar to the second embodiment, but for the variations described above.

It is thought that the present invention and many of its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A portable tree stand assembly, comprising:
    (a) a support bracket structure attachable to a supporting tree and having upper and lower end portions and a middle portion disposed between and interconnecting said upper and lower end portions;
    (b) a seat pivotally mounted to said upper end portion of said support bracket structure;
    (c) a platform pivotally mounted to said lower end portion of said support bracket structure; and
    (d) a seat and platform position adjustment arrangement interconnecting said seat and platform to said middle portion of said support bracket structure, said seat and platform position adjustment arrangement including
        (i) an elongated arm having a pair of opposite ends,
        (ii) means for pivotally interconnecting said elongated arm at one of said opposite ends thereof to said seat and pivotally interconnecting said elongated arm at the other of said opposite ends thereof to said platform, wherein said means for pivotally interconnecting said elongated arm to said seat is a T-bar having a cross member pivotally connected at opposite ends to said seat and a stem member attached to and extending outwardly from said cross member and removably slidably connected with said one end of said elongated arm to provide pivotal connection of said arm with said seat during use of said assembly in an erect condition and disconnection of said arm from said seat to convert said assembly to a collapsed condition, and (iii) means for pivotally interconnecting one of said platform and seat to said support bracket structure and for concurrently adjusting said platform and seat relative to said support bracket structure so as to movably place and retain said platform and seat in respective substantially level positions for a range of lean angles of said support bracket structure.

2. A portable tree stand assembly, comprising:

(a) a support bracket structure attachable to a supporting tree and having upper and lower end portions and a middle portion disposed between and interconnecting said upper and lower end portions;

(b) a seat pivotally mounted to said upper end portion of said support bracket structure;

(c) a platform pivotally mounted to said lower end portion of said support bracket structure; and (d) a seat and platform position adjustment arrangement interconnecting said seat and platform to said middle portion of said support bracket structure, said seat and platform position adjustment arrangement including
  (i) an elongated arm having a pair of opposite ends,
  (ii) means for pivotally interconnecting said elongated arm at one of said opposite ends thereof to said seat and pivotally interconnecting said elongated arm at the other of said opposite ends thereof to said platform, and
  (iii) means for pivotally interconnecting one of said platform and seat to said support bracket structure and for concurrently adjusting said platform and seat relative to said support bracket structure so as to movably place and retain said platform and seat in respective substantially level positions for a range of lean angles of said support bracket structure, wherein said pivotal interconnections establish a parallelogram relationship between said support bracket structure, arm, seat and platform that ensures said seat will pivot with and remain in the same orientation as said platform as said platform is pivoted relative to said support bracket structure.

3. A portable tree stand assembly, comprising:

(a) a support bracket structure attachable to a supporting tree and having upper and lower end portions and a middle portion disposed between and interconnecting said upper and lower end portions;

(b) a seat pivotally mounted to said upper end portion of said support bracket structure;

(c) a platform pivotally mounted to said lower end portion of said support bracket structure; and (d) a seat and platform position adjustment arrangement interconnecting said seat and platform to said middle portion of said support bracket structure, said seat and platform position adjustment arrangement including
  (i) an elongated arm having a pair of opposite ends,
  (ii) means for pivotally interconnecting said elongated arm at one of said opposite ends thereof to said seat and pivotally interconnecting said elongated arm at the other of said opposite ends thereof to said platform, and
  (iii) means for pivotally interconnecting one of said platform and seat to said support bracket structure and for concurrently adjusting said platform and seat relative to said support bracket structure so as to movably place and retain said platform and seat in respective substantially level positions for a range of lean angles of said support bracket structure, wherein said pivotally interconnecting means includes a plurality of attachment elements provided on said middle portion of said support bracket structure at different vertically spaced locations thereon and a pair of elongated coupling members each having a pair of opposite ends and being releasably attachable at one of said opposite ends to a selected one of said attachment elements on said middle portion of said support bracket structure and being attachable at the other of said opposite ends to said platform.

4. The assembly of claim 3 wherein said attachment elements are hook members mounted to said middle portion of said support bracket structure at said different vertically spaced locations thereon, the other of said opposite ends of each of said coupling members is releasably attachable to selected ones of said hook members of said support bracket structure.

5. The assembly of claim 4 wherein each of said coupling members includes:

an elongated flexible cable having a pair of opposite ends each in the form of a loop, said loops at one of said opposite ends of said cables being attached to said hook members on said platform; and a turnbuckle element coupled to one of said end loops at the other of said opposite ends of said respective cable and being attached to said hook members on said support bracket structure and operable to adjust the length of said cable.

\* \* \* \* \*